(12) United States Patent
Bennett et al.

(10) Patent No.: US 9,063,268 B2
(45) Date of Patent: Jun. 23, 2015

(54) DUAL COATED OPTICAL FIBERS AND METHODS FOR FORMING THE SAME

(75) Inventors: Kevin Wallace Bennett, Hammondsport, NY (US); Joohyun Koh, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 283 days.

(21) Appl. No.: 13/577,292

(22) PCT Filed: Feb. 17, 2011

(86) PCT No.: PCT/US2011/025216
§ 371 (c)(1), (2), (4) Date: Sep. 24, 2012

(87) PCT Pub. No.: WO2011/106231
PCT Pub. Date: Sep. 1, 2011

(65) Prior Publication Data
US 2013/0071078 A1 Mar. 21, 2013

Related U.S. Application Data

(60) Provisional application No. 61/307,484, filed on Feb. 24, 2010.

(51) Int. Cl.
*G02B 6/02* (2006.01)
*C03C 25/10* (2006.01)
*C03C 25/32* (2006.01)

(52) U.S. Cl.
CPC .............. *G02B 6/02* (2013.01); *C03C 25/1065* (2013.01); *C03C 25/32* (2013.01); *G02B 6/02395* (2013.01)

(58) Field of Classification Search
None
See application file for complete search history.

(56) References Cited

U.S. PATENT DOCUMENTS

| 5,504,830 | A | 4/1996 | Ngo et al. |
| 8,676,011 | B1 * | 3/2014 | McNutt et al. ................ 385/109 |
| 2005/0135763 | A1 | 6/2005 | Drenzek et al. |

FOREIGN PATENT DOCUMENTS

| EP | 0939064 | 9/1999 |
| GB | 2214653 | 6/1989 |
| GB | 2214653 | 9/1989 |
| JP | 5-127052 | 5/1993 |

OTHER PUBLICATIONS

International Search Report issued May 17, 2011 in counterpart application No. PCT/US2011/025216.

* cited by examiner

*Primary Examiner* — Tina Wong
(74) *Attorney, Agent, or Firm* — Svetlana Short

(57) ABSTRACT

Dual coated optical fibers and methods for forming dual coated optical fibers are disclosed herein. The dual coated optical fibers include a glass fiber comprising a core region, a cladding region and a dual coating layer surrounding the glass fiber. The dual coating layer includes an inner coating and an outer coating. The inner coating surrounds the glass fiber and includes a first polyimide material. In one embodiment the first polyimide material also includes an adhesion promoter. The outer coating surrounds and is in direct contact with the inner coating and includes a second polyimide material having a decomposition threshold temperature greater than the first polyimide material. The second polyimide material may also have a modulus of elasticity greater than the first polyimide material and a moisture uptake lower than the first polyimide material.

11 Claims, 4 Drawing Sheets

A. Comparative Example (Before Soak)

B. Comparative Example (After Soak)

C. Fibers with Dual-Layer Coating (Pre-Soak)

D. Fibers with Dual-Layer Coating (After-Soak)

DUAL COATED OPTICAL FIBERS AND METHODS FOR FORMING THE SAME

This application claims the benefit of priority of U.S. Provisional Application Ser. No. 61/307,484 filed on Feb. 24, 2010.

FIELD

The present specification generally relates to coated optical fibers and, more specifically, to coated optical fibers for use at elevated temperatures and/or aqueous environments.

TECHNICAL BACKGROUND

Optical fibers are commonly utilized in telecommunication applications due to their high transmission capacity and immunity to electromagnetic interference and other advantageous properties. In recent years optical fibers have also gained acceptance in sensing applications including point and/or distributed sensing applications. For example, optical fibers have been utilized to measure the strain in bridges, buildings and other civil structures. Optical fibers have also been utilized to measure pressure and temperature in oil and gas wells, platforms, pipelines as well as the structural integrity of military and commercial aerospace and marine vessels.

As the use of optical fibers in sensing applications is expanded to include applications in ever more extreme environments, including, without limitation, high temperatures and excessive moisture, etc., a need exists for alternative optical fibers having coatings capable of withstanding such extreme environmental conditions.

SUMMARY

According to one embodiment, a coated optical fiber includes a glass fiber comprising a core region, a clad region and a dual coating layer surrounding the glass fiber. The dual coating layer includes an inner coating and an outer coating. The inner coating surrounds the glass fiber and comprises a first polyimide material. The outer coating surrounds and is in direct contact with the inner coating and includes a second polyimide material having a decomposition threshold temperature greater than the first polyimide material.

In another embodiment, a method for forming a coated optical fiber includes applying a first polyimide material to a glass fiber to form an inner coating surrounding the glass fiber. The glass fiber with the inner coating is then heated to cure the first polyimide material of the inner coating. Thereafter, a second polyimide material is applied directly on to the inner coating to form an outer coating. The second polyimide material has a decomposition threshold temperature greater than the first polyimide material. The glass fiber with the inner coating and the outer coating is then heated to cure the second polyimide material of the outer coating.

In another embodiment, a dual coated optical fiber includes a glass fiber comprising a core region and a clad region. A dual coating layer surrounds the glass fiber. The dual coating layer includes an inner coating and an outer coating. The inner coating surrounds the glass fiber and includes a mixture of a polyamic acid of benzophenone tetracarboxylic dianhydride/4,4-oxydianiline/m-phenylenediamine polymer and an organosilane adhesion promoter. The outer coating surrounds and is in direct contact with the inner coating. The outer coating includes a polymer based on the s-biphenyldianhydride/p-phenylenediamine backbone chemistry.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
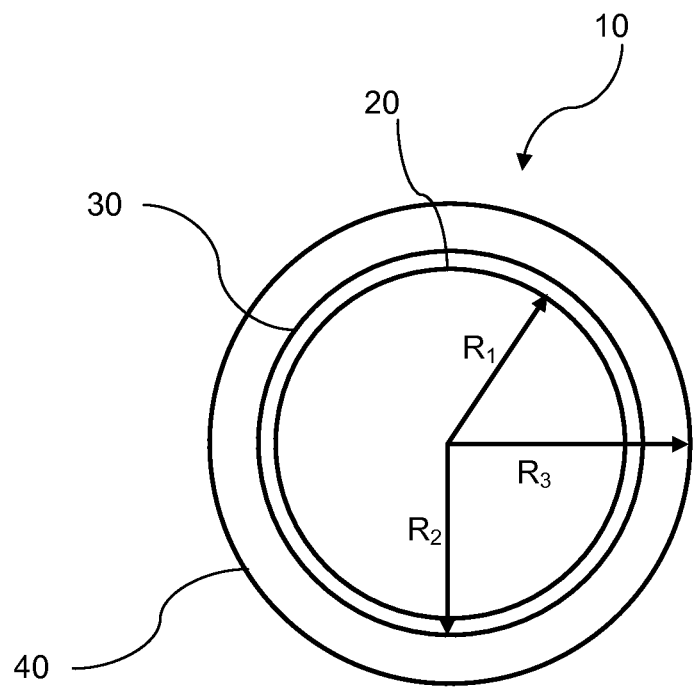
FIG. 1A schematically depicts an optical fiber with a dual coating structure according to one or more embodiments shown and described herein.

Reference will now be made in detail to embodiments of dual coated optical fibers, examples of which are illustrated in the accompanying drawings. Whenever possible, the same reference numerals will be used throughout the drawings to refer to the same or like parts. One embodiment of a dual coated optical fiber is schematically depicted in FIG. 1A. The dual coated optical fiber generally comprises a glass fiber surrounded by a dual coating layer comprising an inner coating and an outer coating. The inner coating comprises a mixture of a first polyimide material and an adhesion promoter for improving the bond between the inner coating and the glass fiber. The outer coating comprises a second polyimide material with a greater decomposition threshold temperature than the first polyimide material. The structure and composition of dual coated optical fibers and the properties of the dual coated optical fiber will be described in more detail herein.

Referring to FIG. 1A, a dual coated optical fiber 10 is schematically depicted according to one or more embodiments described herein. The dual coated optical fiber 10 is particularly well suited for use at high temperatures and/or wet environments. The dual coated optical fiber 10 comprises a glass fiber 20 surrounded by a dual coating layer comprising and inner coating 30 and an outer coating 40. The inner coating surrounds the glass fiber and, in turn, is surrounded by and in direct contact with the outer coating 40. In the embodiment shown in FIG. 1A, the inner coating 30 is in direct contact with the glass fiber 20. The glass fiber 20 has a radius $R_1$ from the centerline and is formed from silica-based glass. The radius $R_1$ may be from about 12.5 microns to about 155 microns, more preferably less than about 125 microns, and even more preferably, less than about 100 microns. In some embodiments the radius $R_1$ is from about 61.5 microns to about 63.5 microns and, more preferably, from about 62 microns to about 63 microns. In other embodiments the radius $R_1$ of the glass fiber is from about 14.5 microns to about 15.5 microns while in other embodiments the radius $R_1$ of the glass fiber is from about 39 microns to about 41 microns. In still other embodiments the radius $R_1$ of the optical fiber is from about 290 microns to about 310 microns.

The glass fiber 20 generally comprises a glass core region (not shown) and a cladding region (not shown) which surrounds the core region. The core region facilitates guiding light through the glass fiber 20. In some embodiments the cladding region comprises one or more glass cladding layers (not shown) surrounding the glass core region. The glass core region and/or the glass cladding layer(s) may be formed from pure silica glass (i.e., silica glass substantially free from any dopants which would alter the index of refraction of pure silica glass) or formed from silica glass which contains dopants that increase the index of refraction of silica glass (e.g., germania or similar index increasing dopants) or dopants that decrease the index of refraction of pure silica glass (e.g., fluorine, boron or similar index decreasing dopants). In the embodiments described herein the glass fiber 20 may be constructed such that the dual coated optical fiber 10 is single moded, multi-moded, bend insensitive, high index, or has any other desired optical and/or physical property.

The inner coating 30 surrounds the glass fiber 20. The inner coating 30 extends from the radius $R_1$ of the glass fiber 20 to a radius $R_2$ such that the inner coating 30 has a radial thickness $T_2=R_2-R_1$. In the embodiments described herein the radial thickness $T_2$ of the inner coating 30 is from about 1 micron to about 10 microns, more preferably from about 3 microns to about 7 microns and, most preferably, from about 4 microns to about 6 microns.

In general, the inner coating 30 comprises a polyimide material which has a decomposition threshold temperature which is less than the decomposition threshold temperature of the second polyimide material in the outer coating 40. The first polyimide material of the inner coating 30 may also have a modulus of elasticity which is less than the modulus of elasticity of the second polyimide material in the outer coating 40 and a moisture uptake which is greater than the moisture uptake of the second polyimide material. In one embodiment, the first polyimide material comprises substituents selected from the group consisting of benzophenone tetracarboxylic dianhydrides, 4,4-oxydianilines, phenylenediamines or combinations thereof. For example, the first polyimide material comprises a polymer comprising a polyamic acid of benzophene tetracarboxylic dianhydride/4,4-oxydianiline/m-phenylenediamine.

An example of a commercially available polyimide material suitable for use in the inner coating is Pyralin® PI-2574 manufactured by HD Microsystems. Pyralin® PI-2574 has a modulus of 2.4 GPa, a moisture uptake of 2-3% and a decomposition threshold temperature of 550° C. after thermal curing. However, it should be understood that Pyralin® PI-2574 is one example of a commercially available polyimide material that can be used for the first polyimide material in the inner coating and that other polyimide materials with suitable characteristics may also be used as the first polyimide material of the inner coating.

In one embodiment, the first polyimide material of the inner coating comprises an adhesion promoter that improves the bond between the inner coating 30 and the glass fiber 20. For example, the adhesion promoter may be an organosilane that comprises either an amino group or an epoxy group. Examples of such organosilanes include aminosilane-based adhesion promoters such as a-aminopropyltrimethoxysilane. However, it should be understood that other organosilanes with different functional groups may also be used as adhesion promoters in the fibers described herein. Further, it should also be understood that other adhesion promoters suitable for improving the adhesion of a polymer to glass may also be used. Some non-limiting examples of aminosilane based adhesion promoters include VM-651 and VM-652 adhesion promoters manufactured by HD Micro Systems.

While in some embodiments the inner coating 30 comprises a polyimide material which contains an adhesion promoter, in other embodiments the adhesion promoter may be separately applied around the glass fiber 20 before the first polyimide material is applied around the glass fiber. The separate adhesion promoter may generally comprise a material which improves the ability of the first polyimide material to bond with the silica glass as described above. For example, the separate adhesion promoter may be an organosilane which comprises either an amino group or an epoxy group. Examples of such organosilanes include aminosilane-based adhesion promoters such as a-aminopropyltrimethoxysilane. However, it should be understood that other organosilanes with different functional groups may also be used as separate adhesion promoters in the fibers described herein. Further, it should also be understood that other adhesion promoters suitable for improving the adhesion of a polymer to glass may also be used.

In one example, the inner coating may be formed from a polyimide precursor, such as Pyraline® PI-2525 manufactured by HD Microsystems, or a similar polyimide precursor material. In this example the PI-2525 polyimide precursor does not include an adhesion promoter and, as such, a separate aminosilane adhesion promoter such as VM-651 or VM-652, both of which are manufactured by HD Microsystems, may be applied to the glass fiber prior to the application of the inner coating to improve the adhesion of the polyimide material to the glass fiber.

The outer coating 40 surrounds and is in direct contact with the inner coating 30. The outer coating 40 extends from the radius $R_2$ of the inner coating 30 to a radius $R_3$ such that the outer coating 40 has a radial thickness $T_3=R_3-R_2$. In the embodiments described herein the radial thickness $T_3$ of the outer coating 40 is preferably from about 5 microns to about 20 microns, more preferably from about 7 microns to about 13 microns and, most preferably, from about 9 microns to about 11 microns.

The outer coating 40 comprises a second polyimide material which has a decomposition threshold temperature that is greater than the decomposition threshold temperature of the first polyimide material. In the embodiments described herein the second polyimide material of the outer coating 40 has a decomposition threshold temperature that is preferably greater than about 550° C., more preferably greater than about 580° C., and most preferably greater than about 620° C. Further, in some embodiments the second polyimide material also has a modulus of elasticity which is greater than the modulus of elasticity of the first polyimide material. For example, the modulus of elasticity of the second polyimide material may be greater than about 2.5 GPa, more preferably greater than about 5.0 GPa, and, most preferably, greater than about 8.5 GPa. In some embodiments the second polyimide material also has a moisture uptake which is lower than the moisture uptake of the first polyimide material. For example, the second polyimide material has moisture uptake which is preferably less than about 3.0%, more preferably less than about 1.5%, and, most preferably, less than about 0.5%.

In one embodiment, the second polyimide material of the outer coating comprises substituents selected from the group consisting of byphenyldianhydrides, pheylenediamines, or combinations thereof. In one embodiment, the second polyimide material comprises a polymer based on biphenyldianhydride/phenylenediamine backbone chemistry. For example, the second polyimide material may be a polymer with s-biphenyldianhydride/p-phenylenediamine backbone chemistry.

An example of a commercially available polyimide material suitable for use as the outer coating is PI-2611 manufactured by HD Microsystems. PI-2611 had a modulus of 8.5 GPa, a moisture uptake of 0.5% and a decomposition threshold temperature of 620° C. after thermal curing. However, it should be understood that PI-2611 is one example of a commercially available polyimide material that can be used for the second polyimide material in the outer coating and that other polyimide materials with suitable characteristics may also be used as the second polyimide material of the outer coating.

Figure 1B:
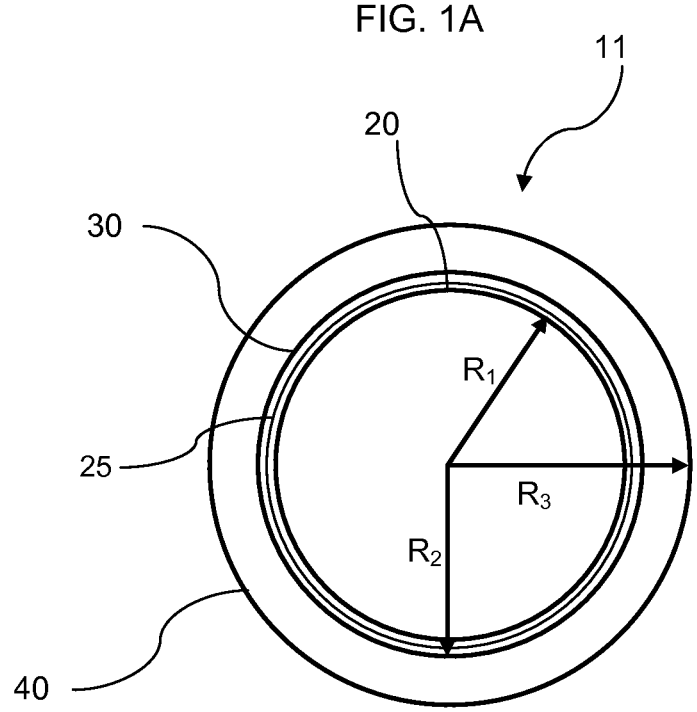
FIG. 1B schematically depicts an optical fiber with a dual coating structure according to one or more embodiments shown and described herein.

Referring to FIG. 1B, another embodiment of a dual coated optical fiber 11 is schematically depicted. In this embodiment, the dual coated optical fiber comprises a glass fiber 20 surrounded by an inner coating 30 which is, in turn, surrounded by and in direct contact with an outer coating 40. The material and dimensions of the glass fiber 20, the inner coating 30 and the outer coating 40 of the dual coated optical fiber 11 are the same as the dual coated optical fiber 10 depicted in FIG. 1A and described above. However, in this embodiment, a hermetic coating 25 is positioned between the glass fiber 20 and the inner coating 30 such that the hermetic coating 25 is in direct contact with both the glass fiber 20 and the inner coating 30. The hermetic coating 25 improves the mechanical integrity of the optical fiber. Specifically, the hermetic coating acts as a protective layer which prevents the ingress of molecular water or hydrogen into the glass fiber 20. The hermetic coating 25 also facilitates deploying the dual coated fiber under small coil diameters.

The hermetic coating 25 may be deposited on the glass fiber 20 before the inner coating 30 is applied to the optical fiber. The hermetic coating 25 may be applied by chemical vapor deposition (CVD) or any other suitable technique. The material from which the hermetic coating is formed may include: metals and alloys such as aluminum, gold, nickel or similar elemental or alloyed metals; carbon or compounds of carbon; or ceramic materials such as $TiO_2$, $TiN$, $Si_3N_4$, $SiC$, $TiC$ or similar ceramic materials. In the embodiments described herein, the hermetic coating 25 is amorphous carbon and has a radial thickness from about 30 nm to about 500 nm.

Further, in embodiments where the optical fiber includes a hermetic coating 25, the radial thickness of the hermetic coating 25 is nominal relative to the radius $R_1$ of the glass fiber. In these embodiments the radius of the glass fiber $R_1$ includes the radial thickness of the hermetic coating 25.

The dual coated optical fibers formed as described herein with an inner coating of a first polyimide material and an outer coating of a second polyimide material having a decomposition threshold temperature greater than the first polyimide material are resistant to delamination following exposure to aqueous environments for extended periods of time. Further, the dual coated optical fibers formed as described herein have tensile strengths of at least 100 kpsi, more preferably greater than 200 kpsi and, most preferably, greater than 300 kpsi following exposure to elevated temperatures of 300° C. for 216 hours. Methods of forming the dual coated optical fibers will now be described with reference to FIGS. 1A and 2.

Figure 2:
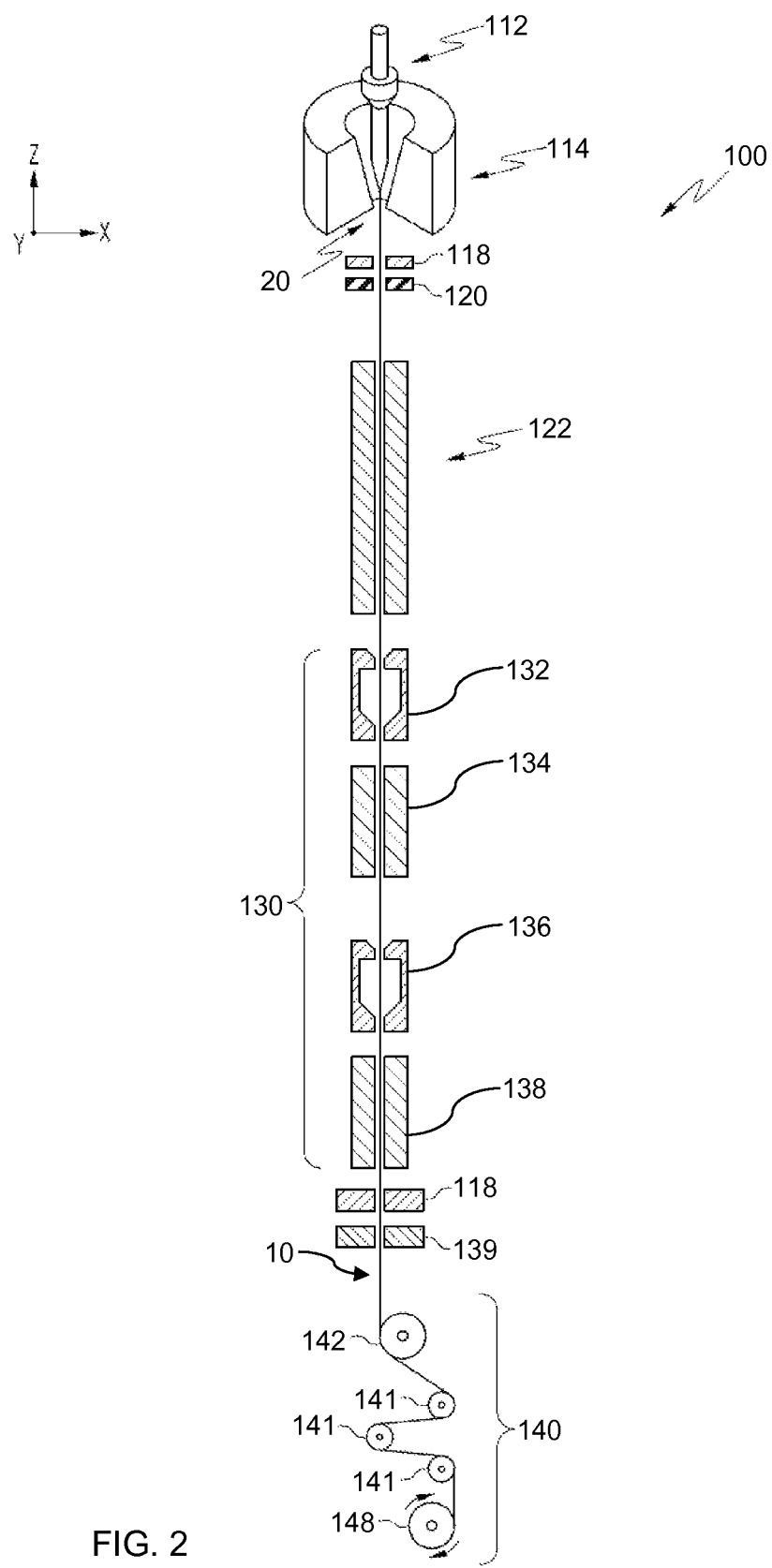
FIG. 2 schematically depicts a system for producing an optical fiber with a dual coating structure according to one or more embodiments shown and described herein.

Referring to FIGS. 1A and 2, one embodiment of a system 100 for producing coated optical fiber is illustrated. The system 100 may comprise a draw furnace 114 for heating an optical fiber preform 112 such that a glass fiber 20 may be drawn from the optical fiber preform 112. The draw furnace 114 may be vertically oriented such that the glass fiber 20 drawn from the optical fiber preform 112 exits the draw furnace along a substantially vertical pathway (i.e., a pathway that is substantially parallel with the z-direction of the coordinate axes depicted in FIG. 2).

After the glass fiber 20 exits the draw furnace 114, the diameter of the glass fiber 20 and the draw tension applied to the glass fiber 20 may be measured using non-contact sensors 118, 120.

Where the dual coated optical fiber comprises a hermetic coating 25 in contact with the glass fiber 20, the hermetic coating 25 may be applied to the glass fiber after the glass fiber exits the draw furnace and either before or after the diameter and draw tension applied to the glass fiber 20 are measured. In this embodiment, the glass fiber 20 may be drawn through a hermetic layer coating system (not shown), such as a CVD system, which deposits the hermetic coating 25 on to the glass fiber 20.

In one embodiment, the glass fiber 20 may optionally be drawn through a cooling system 122 which cools the glass fiber 20 prior to the inner coating 30 being applied to the glass fiber 20. The cooling system 122 is generally spaced apart from the draw furnace 114 such that the glass fiber 20 of the dual coated optical fiber 10 cools at ambient temperatures before entering the cooling system 122. For example, the spacing between the draw furnace 114 and the cooling system 122 may be sufficient to cool the optical fiber from the draw temperature (e.g., from about 1700° C.-2000° C.) to about 1300° C. and, more preferably, to about 1200° C. before the glass fiber 20 enters the cooling system 122. As the glass fiber 20 travels through the cooling system 122, the fiber is cooled to less than about 80° C. and, more preferably, less than about 60° C.

While a cooling system and a hermetic coating system have been described herein as part of the system 100 for producing a coated optical fiber, it should be understood that the cooling system and the hermetic layer coating system are optional and that, in other embodiments, the glass fiber may be drawn directly from the draw furnace to a coating system without entering a cooling system and/or a hermetic layer coating system.

Still referring to FIGS. 1A and 2, after the glass fiber 20 exits the cooling system 122, the glass fiber 20 enters a coating system 130 where the inner coating 30 and the outer coating 40 are applied to the glass fiber 20. In the embodiment shown in FIG. 2 the coating system 130 includes a primary coating die 132 for applying the inner coating 30, a primary curing unit 134 for curing the inner coating 30, a secondary coating die 136 for applying the outer coating 40 and a secondary curing unit 138 for curing the outer coating 40. The primary curing unit 134 and the secondary curing unit 138 are thermal curing units suitable for curing polyimide materials. However, in other embodiments, such as when an adhesion promoter is applied to the glass fiber 20 prior to the inner coating 30 being applied to the glass fiber 20, the coating system 130 may further comprise a preliminary coating unit (not shown) positioned upstream of the primary coating die 132. The preliminary coating unit may be used to apply an adhesion promoter to the glass fiber 20 prior to the glass fiber entering the primary coating die 132.

As the glass fiber 20 passes through the primary coating die 132 the inner coating 30 is applied to the glass fiber 20. As described above, the inner coating 30 comprises a first polyimide material and an adhesion promoter and, as such, a separate adhesion promoter need not be applied to the glass fiber. In the embodiment shown in FIG. 2, the glass fiber 20 enters a primary curing unit 134 after exiting the primary coating die 132. The primary curing unit 134 is operated at a temperature suitable for curing the inner coating 30 and driving off any solvents or other volatiles present in the first polyimide material. Because the first polyimide material is cured prior to the outer coating 40 being applied, the dual layer coating described herein may be referred to as a wet on dry coating system.

After the inner coating 30 has been applied to the glass fiber 20 and cured, the glass fiber 20 is drawn through the secondary coating die 136 where the outer coating 40 is applied to the glass fiber 20 over the inner coating 30. As described above, the outer coating 40 comprises a second polyimide material which has a decomposition threshold temperature greater than the decomposition threshold temperature of the first polyimide material. The second polyimide material may also have a modulus of elasticity greater than the first polyimide material and/or a moisture uptake of less than the first polyimide material.

After the outer coating 40 is applied to the glass fiber 20, the glass fiber 20 is drawn through the secondary curing unit 138. The secondary curing unit 138 is operated at a temperature suitable for curing the outer coating 40 and driving off any solvents or other volatiles present in the second polyimide material. Upon exiting the secondary curing unit 138, the glass fiber 20 with the inner coating 30 and the outer coating 40 is a dual coated optical fiber 10.

As the dual coated optical fiber 10 exits the coating system 130, the diameter of the dual coated optical fiber 10 is measured again using a non-contact sensor 118. Thereafter, a non-contact flaw detector 139 is used to examine the dual coated optical fiber 10 for damage and/or flaws that may have occurred during the manufacture of the dual coated optical fiber 10. It should be understood that, after the glass fiber 20 has been coated, the dual coated optical fiber 10 is less susceptible to damage due to mechanical contact. Accordingly, in subsequent processing stages (not shown) mechanical contact with the dual coated optical fiber 10 may be acceptable.

As shown in FIG. 2, a fiber take-up mechanism 140 utilizes various drawing mechanisms 142 and pulleys 141 to provide the necessary tension applied to the dual coated optical fiber 10 as the dual coated optical fiber 10 is drawn through the system 100. Accordingly, it will be understood that the fiber take-up mechanism 140 controls the speed at which the dual coated optical fiber 10 is drawn through the system 100. After manufacture of the dual coated optical fiber 10 is complete, the dual coated optical fiber 10 is wound onto a storage spool 148.

EXAMPLES

The embodiments described herein will be further clarified by the following examples.

Example 1

A dual coated optical fiber was formed by applying an inner coating and an outer coating to a glass fiber. The glass fiber comprised silica-based glass with an outer diameter (i.e., $2*R_1$) of 124.6 microns. An inner coating comprising a first polyimide material was applied directly to the glass fiber such that the inner coating was in direct contact with the glass fiber. The inner coating had a radial thickness of 5.2 microns after thermal curing. The inner coating was formed from Pyralin® PI-2574 manufactured by HD Microsystems. The Pyralin® PI-2574 material contains an adhesion promoter and generally has a modulus of 2.4 GPa, a moisture uptake of 2-3% and a decomposition threshold temperature of 550° C. after thermal curing. The outer coating comprised a second polyimide material with a decomposition threshold temperature greater than the first polyimide material. The outer coating was applied directly to the inner coating and had a radial thickness of 9.5 microns after thermal curing. The outer coating was formed from PI-2611 manufactured by HD Microsystems. The PI-2611 material had a modulus of 8.5 GPa, a moisture uptake of 0.5% and a decomposition threshold temperature of 620° C. after thermal curing.

Figure 4:
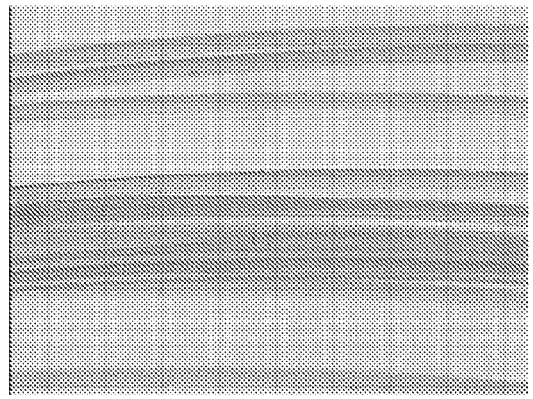
FIG. 4 depicts images of coated optical fibers according to one or more embodiments described herein taken before and after immersion in a deionized water bath and images of fibers from a comparative example taken before and after immersion in a deionized water bath.
Figure 4:
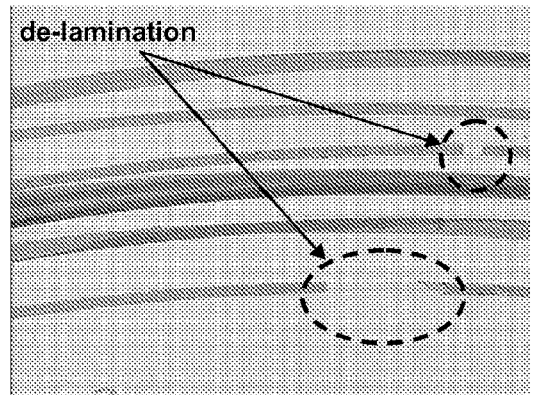
Figure 4:
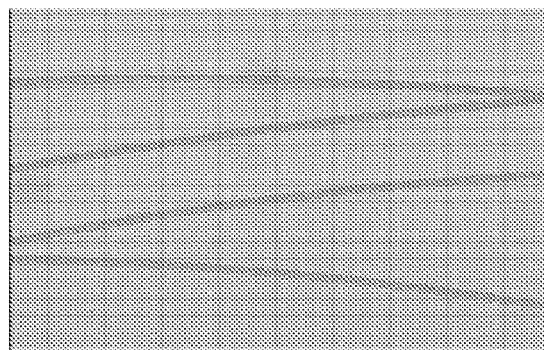
Figure 4:
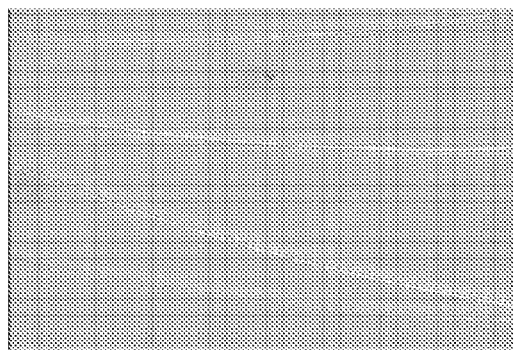

After the inner coating layer and outer coating layer were cured, the dual coated optical fibers were soaked in a deionized water bath for seven days at room temperature. After soaking, the dual coated optical fibers were removed from the deionized water bath and visually inspected to qualitatively determine if the dual layer coating delaminated from the fiber. Images of the dual coated optical fibers before soaking and after soaking are presented in FIGS. 4C and 4D, respectively. As shown in FIGS. 4C and 4D, the dual coated optical fibers did not delaminate during the seven day soaking period.

Comparative Example A

Single layer coated optical fibers were formed by applying a single coating layer of polyimide material directly to a glass fiber. The glass fiber had an outer diameter of 124.8 microns. The polyimide material was PI-2611 manufactured by HD Microsystems, as described above in Example 1. The single coating layer of polyimide material had a radial thickness of 13.6 microns after thermal curing.

After the coating was cured, the single layer coated optical fibers were soaked in a deionized water bath for seven days at room temperature. Following the soaking, the single layer coated optical fibers were removed from the water bath and visually inspected to qualitatively determine if the single layer coating delaminated from the glass fiber. Images of the single layer coated optical fiber before soaking and after soaking are presented in FIGS. 4A and 4B, respectively. As shown in FIGS. 4A and 4B the single layer polyimide coating delaminated during the seven day soaking period producing discontinuities in the coating layer as depicted in FIG. 4B.

Example 2 and Comparative Examples B and C

The optical fibers of Example 2 were dual coated optical fibers produced as described in Example 1. The optical fibers of Comparative Example B were single layer coated optical fibers produced as described in Comparative Example A. The optical fibers of Comparative Example C were single layer coated optical fibers formed by applying a single coating layer of polyimide material containing an adhesion promoter directly to a glass fiber. The glass fiber had an outer diameter of 124.8 microns. The polyimide material of Comparative Example C was Pyralin® PI-2574 manufactured by HD Microsystems, as described above in Example 1. The single coating layer of polyimide material had a radial thickness of 15.6 microns after curing.

After the coatings were cured, the optical fibers from each of Example 2 and Comparative Examples B and C were exposed to temperatures of 300° C. for 2 to 216 hours. Following exposure to the elevated temperature at different time durations, 50 cm gauge lengths of the optical fibers were tensile tested in a controlled environment of 50% relative humidity and a temperature of 22° C. The optical fibers were drawn at a crosshead speed of 500 mm/min until failure. The results of the tensile testing are shown in FIG. 3.

Figure 3:
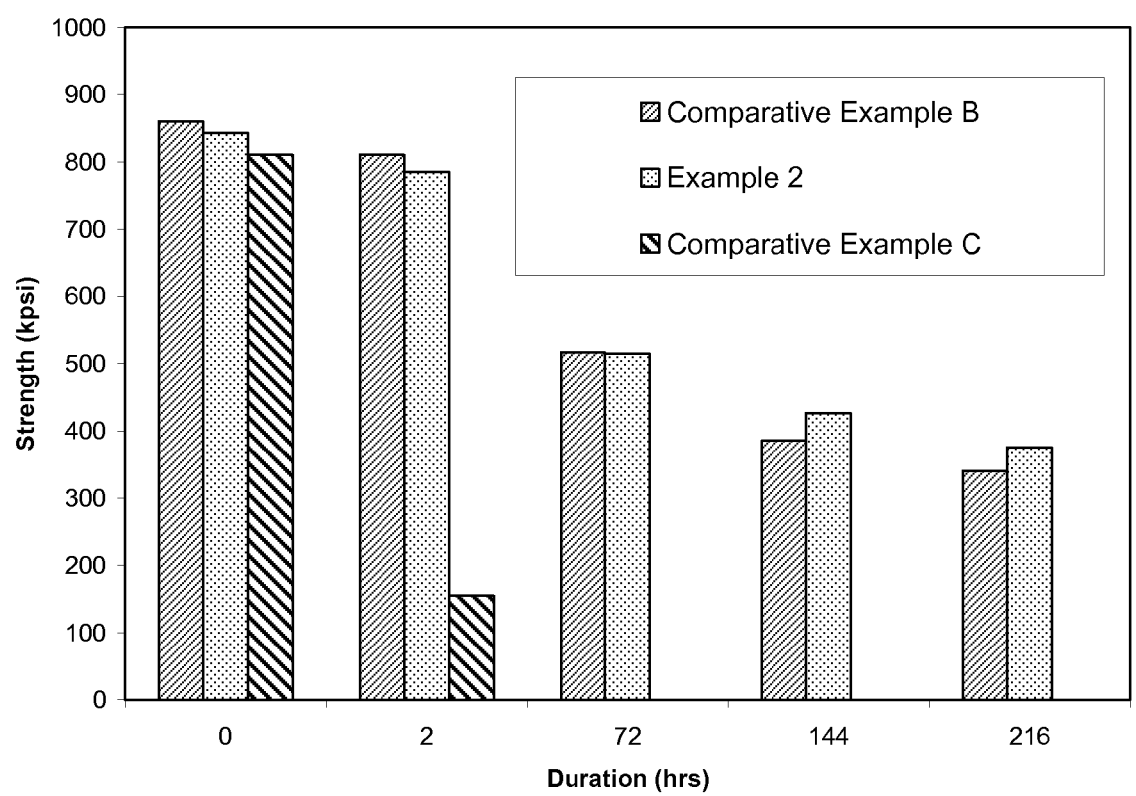
FIG. 3 graphically illustrates the effect of temperature and time on the tensile strength of coated optical fibers according to one or more embodiments shown and described herein and the effect of temperature and time on the tensile strength of comparative examples.

As graphically illustrated in FIG. 3, the coated optical fibers of Example 2 and Comparative Examples B and C have tensile strengths between about 800 kpsi and 900 kpsi prior to exposure to elevated temperatures. And, following exposure to elevated temperatures, the tensile strength of the optical fibers in all three examples decreased. However, the tensile strength of the coated optical fibers of Comparative Example C decreased to zero after less than 72 hours of elevated temperature exposure while the tensile strength of the coated optical fibers of Example 2 and Comparative Example B decreased by less than half during the same time interval. After 144 hours of exposure the tensile strength of the coated optical fibers of Example 2 decreased less than the coated optical fibers of Comparative Example B and, after 216 hours of exposure, the optical fibers of Example 2 had a tensile strength of greater than 300 kpsi.

The results of Examples 1-2 and Comparative Examples A-C indicate that the dual coated optical fibers produced according to embodiments described herein have improved performance characteristics relative to single layer coated optical fibers constructed of similar materials. Specifically, it was determined that the dual coated optical fibers formed with an inner coating of a first polyimide material and an outer coating of a second polyimide material with a higher decomposition threshold temperature than the first polyimide material do not delaminate after immersion in water over an extended time period. However, coated optical fibers formed with a single layer of the second polyimide material delaminated after immersion in water for extended periods of time.

Similarly, it was determined that the tensile strength of the dual coated optical fibers does not decrease as rapidly over time after exposure to elevated temperatures as the tensile strength of optical fibers coated with a single layer of the first polyimide material. Further, it was also determined that the tensile strength of the dual coated optical fibers is greater than or equal to the tensile strength of optical fibers with a single layer of the second polyimide material after 144 hours of exposure to elevated temperatures of 300° C.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A dual coated optical fiber comprising:
   a glass fiber comprising a core region and a cladding region;
   a dual coating layer surrounding the glass fiber and in direct contact with the glass fiber, the dual coating layer comprising:
   an inner coating surrounding the glass fiber, the inner coating comprising a first polyimide material, said first polyimide material comprising a mixture of a polyamic acid of benzophenone tetracarboxylic dianhydride/4,4-oxydianiline/m-phenylenediamine polymer and an organosilane adhesion promoter; and
   an outer coating surrounding and in direct contact with the inner coating, the outer coating comprises a second polyimide material, said second polyimide material comprising an s-biphenyldianhydride/p-phenylenediamine polymer.

2. A dual coated optical fiber according to claim 1, wherein a second polyimide material having a decomposition threshold temperature greater than the first polyimide material.

3. The dual coated optical fiber of claim 2 wherein the decomposition threshold temperature of the second polyimide material is greater than 550° C.

4. The dual coated optical fiber of claim 2 wherein the glass fiber has a radius in a range from 12.5 microns to 155 microns.

5. The dual coated optical fiber of claim 2 wherein the inner coating has a radial thickness in a range from 1 micron to 10 microns.

6. The dual coated optical fiber of claim 2 wherein the outer coating has a radial thickness in a range from 5 microns to 20 microns.

7. The dual coated optical fiber of claim 1 wherein a modulus of elasticity of the an outer coating-second polyimide material is greater than a modulus of elasticity of the first polyimide material.

8. The dual coated optical fiber of claim 1 wherein a moisture uptake of the second polyimide material is lower than a moisture uptake of the first polyimide material.

9. The dual coated optical fiber of claim 1 wherein the dual coating layer does not separate from the glass fiber after immersion in a deionized water bath at room temperature for seven days.

10. The dual coated optical fiber of claim 1 wherein a tensile strength of the dual coated optical fiber is greater than 300 kpsi after exposure to a temperature of 300° C. for 216 hours.

11. The dual coated optical fiber of claim 1, further comprising a hermetic coating between the glass fiber and the inner coating.

* * * * *